(12) United States Patent
Crenshaw

(10) Patent No.: US 11,066,936 B1
(45) Date of Patent: Jul. 20, 2021

(54) TURBINE BLADED DISC BRAZED SEALING PLATE WITH FLOW METERING AND AXIAL RETENTION FEATURES

(71) Applicant: Rolls-Royce Corporation, Indianapolis, IN (US)

(72) Inventor: Cameron Crenshaw, Greenwood, IN (US)

(73) Assignee: Rolls-Royce Corporation, Indianapolis (IN)

(*) Notice: Subject to any disclaimer, the term of this patent is extended or adjusted under 35 U.S.C. 154(b) by 0 days.

(21) Appl. No.: 16/869,173

(22) Filed: May 7, 2020

(51) Int. Cl.
 *F01D 5/18* (2006.01)
 *F01D 5/08* (2006.01)

(52) U.S. Cl.
 CPC .......... *F01D 5/187* (2013.01); *F01D 5/081* (2013.01); *F05D 2220/323* (2013.01); *F05D 2240/55* (2013.01); *F05D 2240/81* (2013.01); *F05D 2260/20* (2013.01)

(58) Field of Classification Search
 None
 See application file for complete search history.

(56) References Cited

U.S. PATENT DOCUMENTS

| | | | |
|---|---|---|---|
| 3,644,058 A * | 2/1972 | Barnabei | F01D 5/326 416/95 |
| 3,728,042 A * | 4/1973 | Hugoson | F01D 5/326 416/95 |
| 5,215,435 A * | 6/1993 | Webb | F01D 5/08 277/414 |
| 5,599,170 A * | 2/1997 | Marchi | F01D 5/22 416/190 |
| 5,971,707 A * | 10/1999 | Uematsu | F01D 5/18 416/96 R |
| 9,951,632 B2 * | 4/2018 | Waldman | F01D 11/006 |
| 2005/0120555 A1 * | 6/2005 | Boudereau | F01D 5/005 29/889.1 |
| 2007/0080505 A1 * | 4/2007 | Nereim | F01D 5/3015 277/630 |
| 2009/0110548 A1 * | 4/2009 | Durocher | F01D 11/001 415/173.4 |
| 2009/0252602 A1 * | 10/2009 | Diakunchak | F01D 11/08 415/173.3 |
| 2011/0014050 A1 * | 1/2011 | Lake | F16J 15/0887 416/204 A |
| 2016/0265370 A1 | 9/2016 | Benson | |
| 2017/0191370 A1 * | 7/2017 | Dawson | F01D 5/081 |
| 2018/0230830 A1 * | 8/2018 | Dawson | F01D 5/3015 |
| 2018/0347390 A1 * | 12/2018 | Wilson | F01D 11/122 |

* cited by examiner

*Primary Examiner* — Michael Lebentritt
(74) *Attorney, Agent, or Firm* — Brinks Gilson & Lione

(57) ABSTRACT

A sealing plate for sealing cooling passages in a cooled turbine blade of a gas turbine engine and directing and controlling air flow through cooling passages is provided.

20 Claims, 16 Drawing Sheets

TURBINE BLADED DISC BRAZED SEALING PLATE WITH FLOW METERING AND AXIAL RETENTION FEATURES

TECHNICAL FIELD

This disclosure relates to radial cooling passages between gas turbine engine blades and discs, and, more specifically, to sealing plates brazed to cooled turbine blades to direct and/or control air flow through radial cooling passages.

BACKGROUND

Gas turbine engines may be used on vehicles such as airplanes and helicopters. These engines are internal combustion engines that operate to produce thrust by discharging a high velocity exhaust. Some gas turbine engines can also include fan blades to create thrust.

Gas turbine engines include one or more compressors, a combustor, and one or more turbines. Air is compressed in the compressor(s), mixed with fuel in the combustor, and ignited, such that exhaust gases are created and discharged through a turbine. The discharge gas rotates the turbine, which is typically used to turn a shaft and produce shaft work output, such as to drive the compressor or a gearbox. There can be one or more turbines and corresponding shafts producing shaft work output. Gas exhausting from the turbine may be further utilized to generate thrust. Systems within a gas turbine engine may use the shaft work output.

Some existing gas turbine engine blades and discs have various shortcomings, drawbacks, and disadvantages relative to certain applications. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

Figure 1:
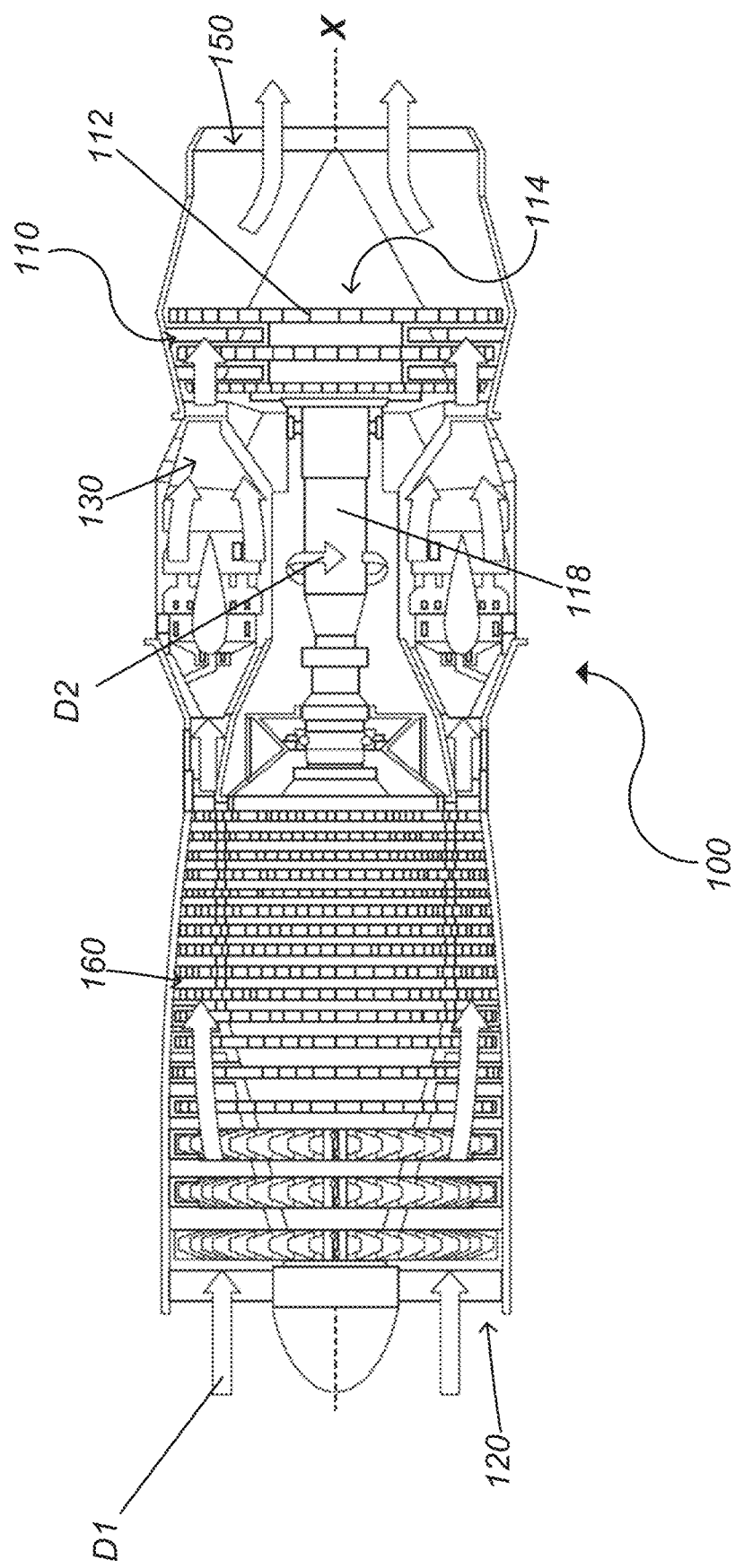
FIG. 1 illustrates a cross-sectional view of an example of a gas turbine engine.

According to an example of the present disclosure, a sealing plate includes an aft tang including an aft tang aft surface, a forward surface, and a metering hole through the aft tang from the forward surface to the aft tang aft surface. The sealing plate further includes an axial tang including an axial tang outer radial surface and an axial tang inner radial surface, the axial tang integral to the aft tang. The sealing plate further includes an interior corner between the forward surface and the axial tang inner radial surface. The axial tang outer radial surface may be brazed to a blade inner radial surface of a cooled turbine blade, the cooled turbine blade including a plurality of radial cooling passages extending radially outward from the inner radial surface. The sealing plate may seal each of the plurality of radial cooling passages except for a forward-most radial cooling passage of the plurality of radial cooling passages. An aft end of a blade-to-disc gap may be sealed by the aft tang when the cooled turbine blade is attached to a turbine disc.

According to another example of the present disclosure, a sealing plate includes an aft tang, including an aft tang aft surface, a forward surface, a metering hole through the aft tang from the forward surface to the aft tang aft surface, radial outward axial retention features, and a radial inward axial retention feature. The sealing plate further includes an axial tang including an axial tang outer radial surface and an axial tang inner radial surface, the axial tang integral to the aft tang. The sealing plate further includes an interior corner between the forward surface and the axial tang inner radial surface. The axial tang outer radial surface may be brazed to a blade inner radial surface of a cooled turbine blade, the cooled turbine blade including a plurality of radial cooling passages extending radially outward from the blade inner radial surface. The sealing plate may seal each of the plurality of radial cooling passages at the blade inner radial surface except for a forward-most radial cooling passage of the plurality of radial cooling passages. The radial outward axial retention features may extend radially outward along a blade aft surface of the cooled turbine blade, the radial outward axial retention features retaining the cooled turbine blade axially. The radial inward axial retention feature may extend radially inward along an aft disc surface of a turbine disc. An aft end of a blade-to-disc gap may be sealed by the aft tang when the cooled turbine blade is attached to a turbine disc.

According to yet another example of the present disclosure, a sealing plate includes an outer surface and an inner surface. The outer surface may be brazed to a blade inner radial surface of a cooled turbine blade, the cooled turbine blade including an aft surface, a forward surface, a plurality of radial cooling passages extending radially outward from the inner radial surface, and an aft tang extending radially inward along the aft surface, the aft tang including a metering hole. The sealing plate may seal each of the plurality of radial cooling passages at the blade inner radial surface except for a forward-most radial cooling passage of the plurality of radial cooling passages.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

As gas turbine engine speeds are gradually increasing in pursuit of more advantageous specific fuel consumption ("SFC"), conventional methods of sealing and retaining hollow turbine blades are becoming more difficult to implement. Cooling air typically flows from the forward face of a disc on which the hollow turbine blades are attached, to a cavity or cooling passage in each of the hollow turbine blades. Turbine blade and disc coverplates generally seal a gap between the turbine blades and the disc, while providing some amount of axial retention to prevent unwanted blade movement. A greater seal in this location typically reduces secondary airflow leakage, which improves overall engine efficiency.

Without being bound by theory, conventional "segmented" coverplates, or conventional "full-hoop" coverplates are designed to seal as much of the gap between the blade and disc of a gas turbine as possible, allowing for separate secondary airflow to be used for disc cooling, cavity purge flow, and various other cooling applications within the gas turbine engines. A full-hoop coverplate is typically piloted onto the main turbine disc to seal the entirety of the disc rim at all blade locations. Full-hoop coverplates may include a forged ring, which may increase difficulty of manufacturing. Further, full-hoop coverplates typically must be retained or carried by the disc, which may result in significant issues with thermal stresses, higher centrifugal loads, and high-stress interference fits encountered during assembly.

As used herein, the term "segmented sealing plate," unless stated otherwise, alone or in combination with other terms, refers to sealing plates that are are positioned radially between a turbine blade and a turbine disc, may load into receivable slots in the aft surfaces of the turbine blade and the turbine disc, sealing the gaps between the blade fir tree root and the disc slot bottom. Multiple segmented coverplates may be loaded circumferentially around the disc, and are locked into place using a retaining feature. Segmented coverplates may alternatively move freely between the turbine blade and the turbine disc. While a segmented sealing plate may seal as much of the gap between a turbine blade and a turbine disc as possible, segmented sealing plates have been shown to disadvantageously move or "walk" around a circumference of a turbine disc due to not being held in place, resulting in loss of efficiency. Further, the centrifugal load caused by segmented coverplates must be carried through a blade, which may be weaker than the disc. At higher engine speeds, the centrifugal load may be too significant for the blade to carry. Additionally, a loading slot in a blade for a segmented coverplate introduces a stress concentration that complicates optimization of blade design.

The turbine blades to which the sealing plates of the present disclosure are brazed are known in the art as "cooled" turbine blades. As used herein, the term "cooled turbine blade," unless stated otherwise, alone or in combination with other terms, refers to turbine blades that operate at temperatures above their melting points. Without being bound by theory, in cooled turbine blades including multipass cooling schemes, it is also important to direct blade cooling air through the designated passage only, while sealing off all other radial cooling passages, often with a plate that is brazed onto the bottom surface of the blade at final assembly.

The terms "brazing," "brazed," and "braze," unless stated otherwise, alone or in combination with other terms, refer to a metal-joining process known in the art in which two or more surfaces that are free of oxides are joined together by melting and flowing a filler metal into the joint, the filler metal having a lower melting point than the adjoining two or more surfaces. The process of "brazing" does not involve melting the two or more surfaces together, as in welding. Further, the process of "brazing" requires that the two more or more surfaces are much more closely fitted surfaces than in soldering. During the process of "brazing," the filler metal flows into the gap between the closely fitting two or more surfaces by capillary action.

FIG. 1 illustrates a cross-sectional view of an example of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

As described herein, the gas turbine engine 100 may operate with a convertible configuration in either a turbofan mode or a turboshaft mode. The gas turbine engine 100 may take a variety of forms in various examples. Though depicted as an axial flow engine, in some examples, the gas turbine engine 100 may have multiple spools and/or may be a centrifugal or mixed centrifugal/axial flow engine. In some examples, the gas turbine engine 100 may be a turbojet or turboprop engine with a convertible configuration. Furthermore, the gas turbine engine 100 may be an adaptive cycle and/or variable cycle engine. Other variations are also contemplated.

The gas turbine engine 100 may include a forward intake section 120, a compressor section 160, a combustion section 130, a turbine section 110, and an aft exhaust section 150. As noted above, the hot, high pressure fluid passes through the turbine section 110 during operation of the gas turbine engine 100. As the fluid flows through the turbine section 110, the fluid passes between blades 112 of the turbine 114 causing the turbine 114 to rotate. The rotating turbine 114 may turn the shaft 118 such that the blades 112 may rotate around an axis of rotation, such as a centerline X of the turbine 114 and the centerline of the gas turbine engine 100 are the same. The blades 112 may extend radially outward from the centerline X of the turbine 114 and rotate circumferentially relative to the centerline X.

The term "aft," as used herein, unless stated otherwise, alone or in combination with other terms, refers to an element, surface, or assembly being situated at, near, or toward a tail of an aircraft or other vehicle. The term "aft" may be distinguished from the term "forward," which, as used herein, unless stated otherwise, alone or combination with other terms, refers to an element, surface, or assembly being situated at, near, or toward a front of an aircraft or other vehicle. The forward and aft directions may refer to opposite directions along an axis, which may be parallel to, or identical to, the centerline X of the turbine 114. The terms "axial" and "axially," as used herein, unless stated otherwise, alone or in combination with other terms, refers to elements, surfaces, and assemblies a along a common axis, which may be forward or aft relative to other elements, surfaces, and/or assemblies.

The terms "radially" and "radial" as used herein, unless stated otherwise, alone or in combination with other terms, refer to elements, surfaces, or assemblies relative to one another along a radius that may project perpendicularly from a centerline axis. The terms "inward" and "inwardly," as used herein, unless stated otherwise, alone or combination with other terms, refer to an element, surface, or assembly being situated at, near, or toward the centerline axis along a radius. The terms "outward" and "outwardly," as used herein, unless stated otherwise, alone or in combination with other terms, refer to an element, surface, or assembly being situated at, or facing away from the centerline axis along a radius. The terms "inward" and "inwardly" and the terms "outward and "outwardly" may refer to opposite directions along a radius projecting perpendicularly from the centerline axis.

The terms "circumferential" and "circumferentially," as used herein, unless stated otherwise, alone or in combination with other terms, refer to elements, surfaces, or assemblies relative to one another encircling a centerline axis at a radius.

Figure 2:
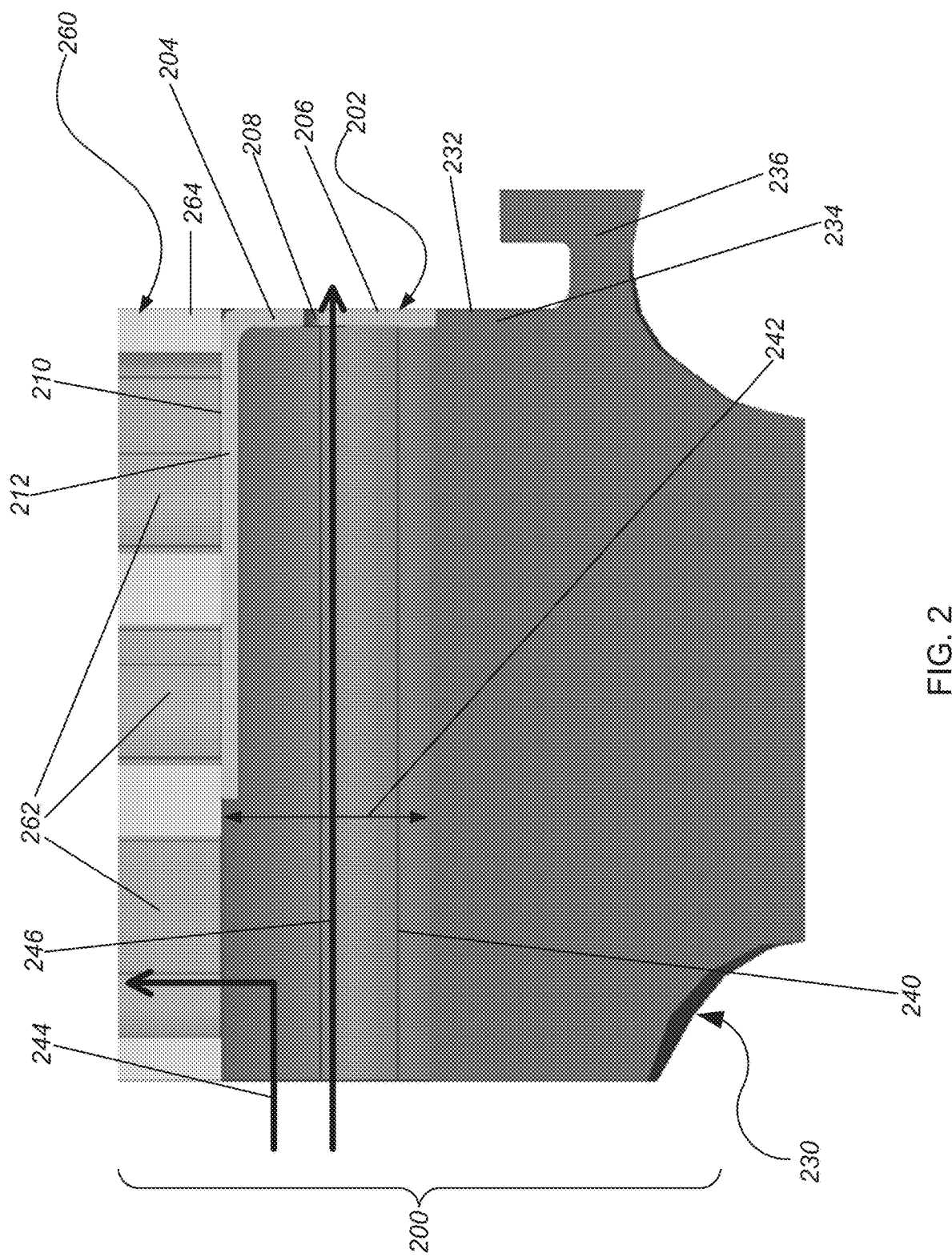
FIG. 2 illustrates a radial, forward-aft axial cross-sectional view of an example of a turbine blade-disc assembly through the circumferential center of the turbine blade-disc assembly including an example of a sealing plate.

FIG. 2 illustrates a radial, forward-aft axial cross-sectional view of an example of a turbine blade-disc assembly 200 through the circumferential center of the turbine blade-disc assembly 200 including an example of a sealing plate 202. The sealing plate 202 includes an axial tang 212, the axial tang 212 integral to the sealing plate 202, and an aft tang 204, the aft tang 204 integral to the sealing plate 202. When the sealing plate 202 is brazed to the blade inner radial surface 268 (not shown in FIG. 2) of the cooled turbine blade 260, and the cooled turbine blade 260 is attached to the disc 230, the aft tang 204 extends in a radial direction across the radial distance 242 of the blade-to-disc gap 240 (not shown in FIG. 2) so as to advantageously seal most of the aft end of the vacant blade-to-disc gap 240, and avoid waste or loss in flow. The aft tang 204 includes a metering hole 208, such that purge cavity flow is advantageously controlled and directed aft of the turbine blade-disc assembly 200 through metering hole 208. Metering hole 208 is configured to receive purge cavity flow. The path of purge cavity flow is indicated by arrow 246. In other examples of the sealing plate 202, the aft tang 204 may include more than one metering hole 208. When the sealing plate 202 is brazed to the blade inner radial surface 268 of the cooled turbine blade 260, the aft tang 204 includes an aft tang aft surface 206 that may be flush with an aft disc surface 232 of an aft portion 234 of the disc 230. Alternatively, or in addition, the aft tang aft surface 206 of the aft tang 204 may be flush with a blade aft surface 264 of the cooled turbine blade 260. The axial tang 212 includes an axial tang outer radial surface 210. The axial tang outer radial surface 210 of the axial tang 212 of the sealing plate 202 is brazed to the blade inner radial surface 268 of the cooled turbine blade 260, and the axial tang 212 is of such forward-aft dimension such that when the sealing plate 202 is brazed to the blade inner radial surface 268 of the cooled turbine blade 260, only the forward-most radial cooling passage 262 is open, and/or configured, to receive blade cooling flow, the path of which is illustrated by arrow 244. Sealing plate 202 may be advantageously stamped and bent from a single piece of sheet metal or temperature-capable alloy.

Figure 3:
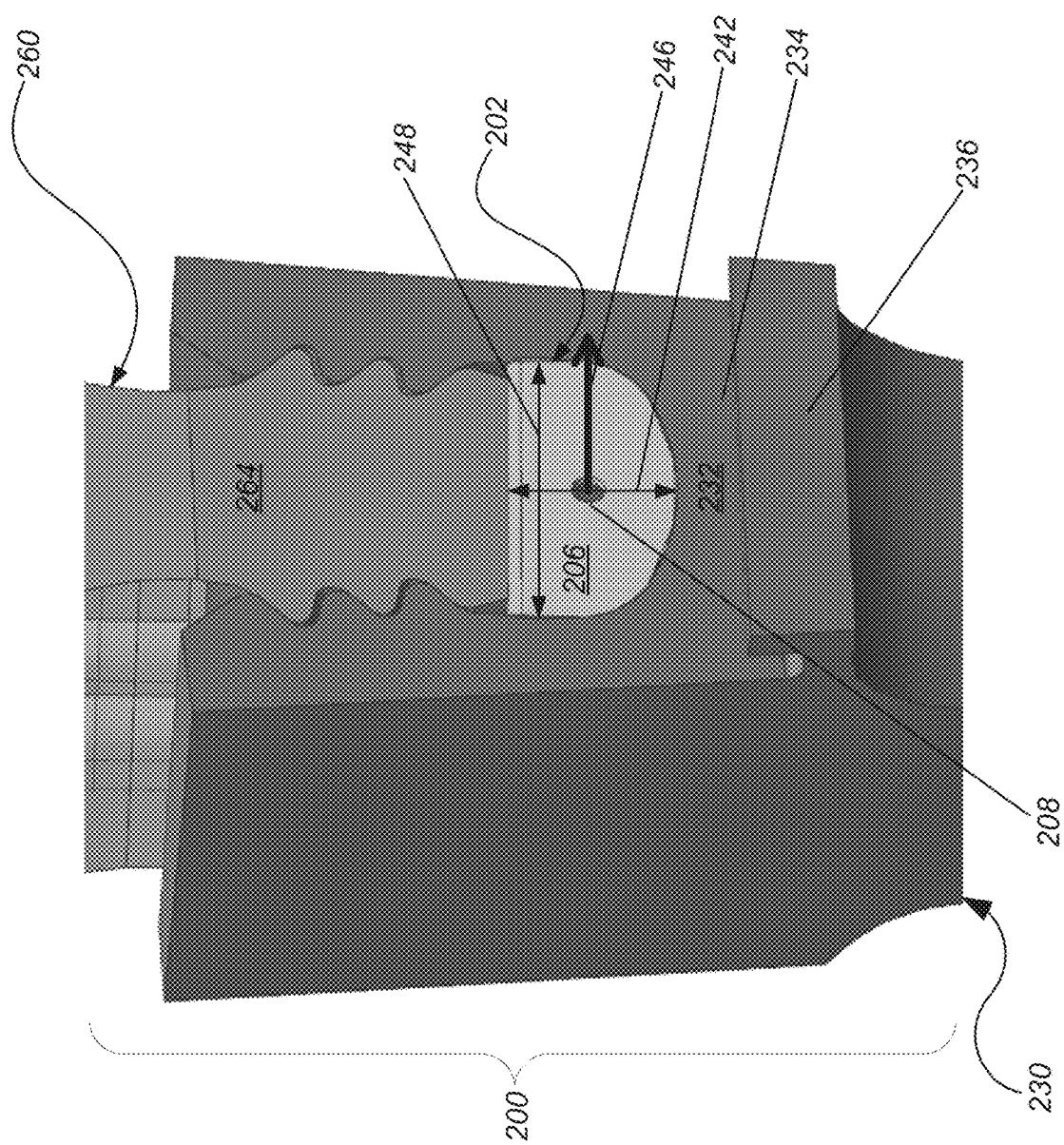
FIG. 3 illustrates an aft perspective view of the example of a turbine blade-disc assembly including the example of a sealing plate of FIG. 2.

FIG. 3 illustrates an aft perspective view of the example of a turbine blade-disc assembly 200 including the example of a sealing plate 202 of FIG. 2. The aft tang 204 extends in a circumferential direction across the circumferential distance 248 of the blade-to-disc gap 240 so as to advantageously seal most of the aft end of the vacant blade-to-disc gap 240. The aft tang 204 also extends in a radial direction across the radial distance 242 of the blade-to-disc gap 240 so as to advantageously seal most of the aft end of the blade-to-disc gap 240 other than metering hole(s) 208 when sealing plate 202 is brazed to the blade inner radial surface 268 of the cooled turbine blade 260.

Figure 4:
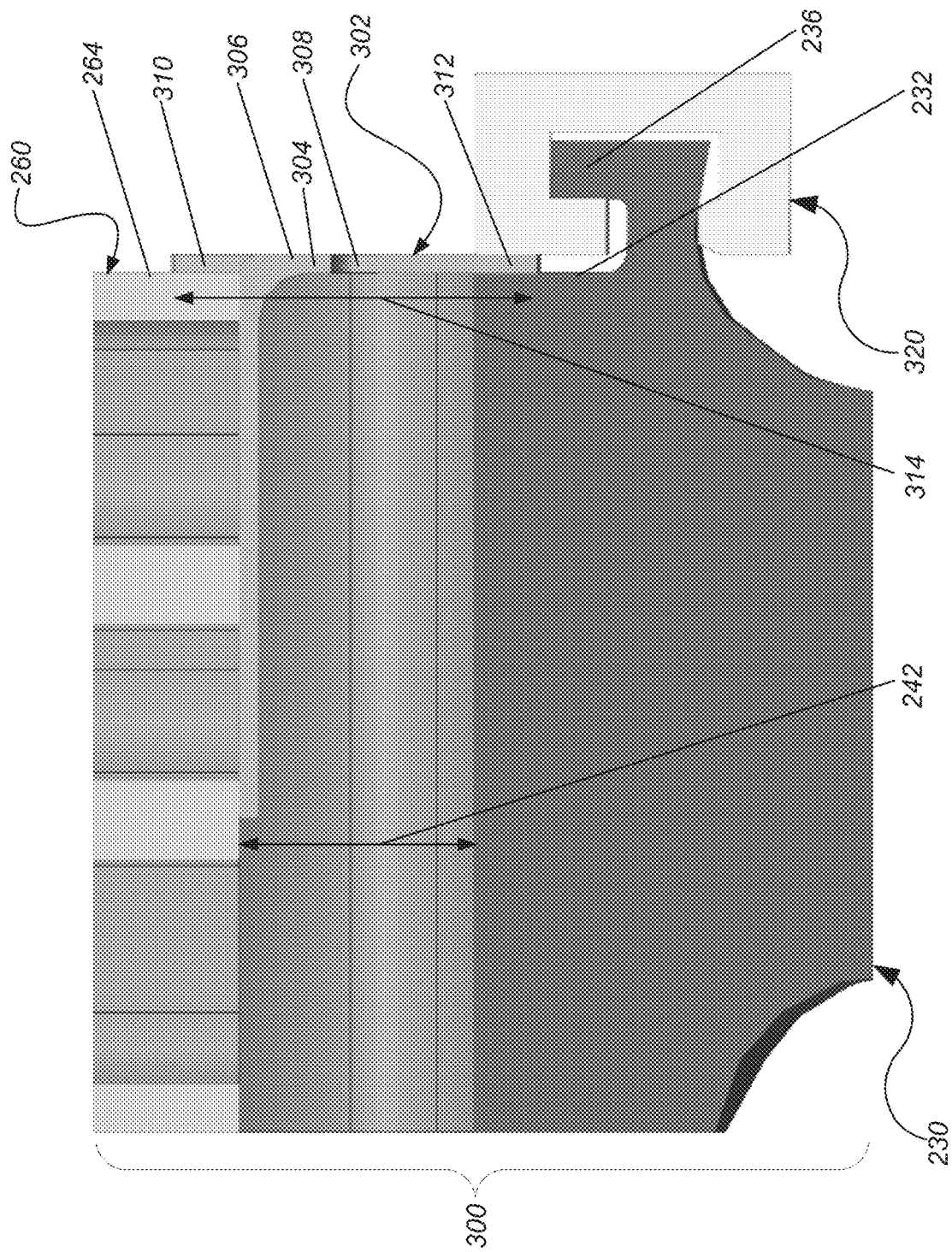
FIG. 4 illustrates a radial, forward-aft axial cross-sectional view of another example of a turbine blade-disc assembly through the circumferential center of the turbine blade-disc assembly including another example of a sealing plate and a retaining clip.

FIG. 4 illustrates a radial, forward-aft axial cross-sectional view of another example of a turbine blade-disc assembly 300 through the circumferential center of the turbine blade-disc assembly 300 including an example of a sealing plate 302. The sealing plate 302 includes an aft tang 304, the aft tang 304 integral to the sealing plate 302, the aft tang 304 including radial outward axial retention feature(s) 310 and radial inward axial retention feature 312, the radial outward axial retention feature(s) 310 and radial inward axial retention feature 312 integral to the aft tang 304. Sealing plate 302 further includes an axial tang, the axial tang integral to the sealing plate 302. The aft tang 304 includes an aft tang aft surface 306, which extends further in the aft direction than the blade aft surface 264 of cooled turbine blade 260 and further in the aft direction than the aft disc surface 232 of disc 230. Consequently, when sealing plate 302 is brazed to the blade inner radial surface 268 (not shown in FIG. 4) of cooled turbine blade 260, and cooled turbine blade 260 is attached to disc 230, aft tang aft surface 306 may not be flush with either blade aft surface 264 of cooled turbine blade 260 or aft disc surface 232 of disc 230. The radial distance 314 from the outer radial edge of radial outward axial retention feature(s) 310 to the inner radial edge of radial inward axial retention feature 312 is greater than the radial distance 242 of the blade-to-disc gap 240 (not shown in FIG. 4). Accordingly, when sealing plate 302 is brazed to the blade inner radial surface 268 of cooled turbine blade 260, and cooled turbine blade 260 is attached to disc 230, the aft tang 304 advantageously seals most of the aft end of the blade-to-disc gap 240, and additionally retains cooled turbine blade 260 axially. The aft tang 304 includes a metering hole 308. Alternatively, the aft tang 304 may include more than one metering hole 308. Retaining clip 320 may be reversibly engaged on aft hanger arm 236 to confront radial inward axial retention feature 312 and retain aft tang 304 against aft disc surface 232 of disc 230. Sealing plate 302 may be advantageously stamped and bent from a single piece of sheet metal or temperature-capable alloy.

Figure 5:
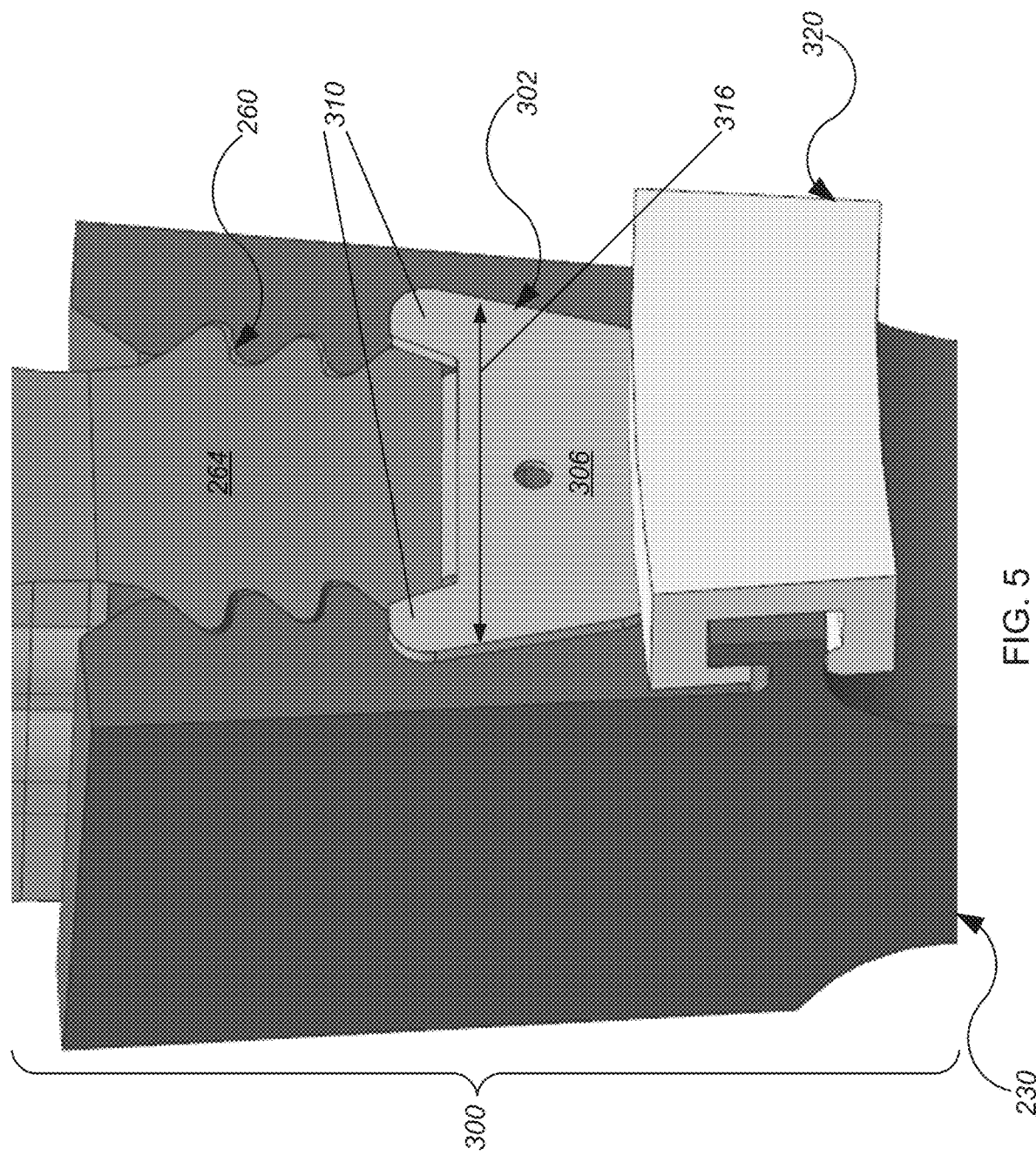
FIG. 5 illustrates an aft perspective view of the example of a turbine blade-disc assembly including the example of a sealing plate and a retaining clip of FIG. 4.

FIG. 5 illustrates an aft perspective view of the example of a turbine blade-disc assembly 300 including the example of a sealing plate 302 and a retaining clip 320 of FIG. 4. The aft tang aft surface 306 of aft tang 304 has a circumferential distance 316 that is greater than the circumferential distance 248 of the blade-to-disc gap 240. Accordingly, the aft tang 304 advantageously seals most of the aft end of the blade-to-disc gap 240 other than metering hole(s) 308 and additionally retains cooled turbine blade 260 axially when sealing plate 302 is brazed to the blade inner radial surface 268 of cooled turbine blade 260, and cooled turbine blade 260 is attached to disc 230.

Figure 6:
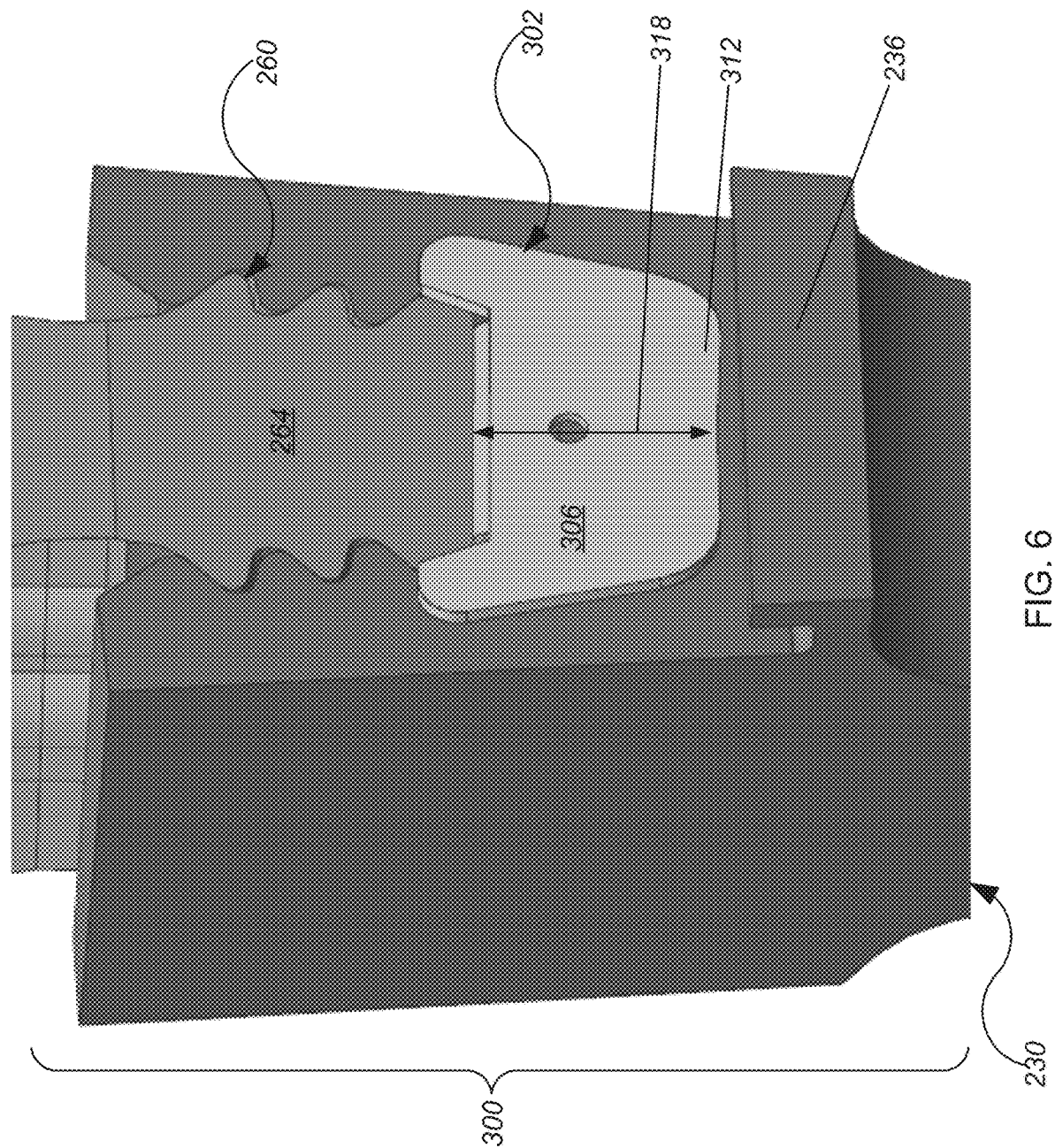
FIG. 6 illustrates an aft perspective view of the example of a turbine blade-disc assembly including the example of a sealing plate of FIG. 4 with the retaining clip removed.

FIG. 6 illustrates an aft perspective view of the example of a turbine blade-disc assembly 300 including the example of a sealing plate 302 of FIG. 4 with retaining clip 320 removed from aft hanger arm 236. The aft surface radial distance 318 from the outer radial edge at the circumferential center to the inner radial edge of the radial inward axial retention feature 312 is greater than the radial distance 242 of the blade-to-disc gap 240. Accordingly, the aft tang 304 advantageously seals most of the aft end of the blade-to-disc gap 240 other than metering hole(s) 308 when sealing plate 302 is brazed to the blade inner radial surface 268 of cooled turbine blade 260, and cooled turbine blade 260 is attached to disc 230. The radial inward axial retention feature 312 may span the circumferential distance of the inner radial edge of aft tang aft surface 306.

Figure 7:
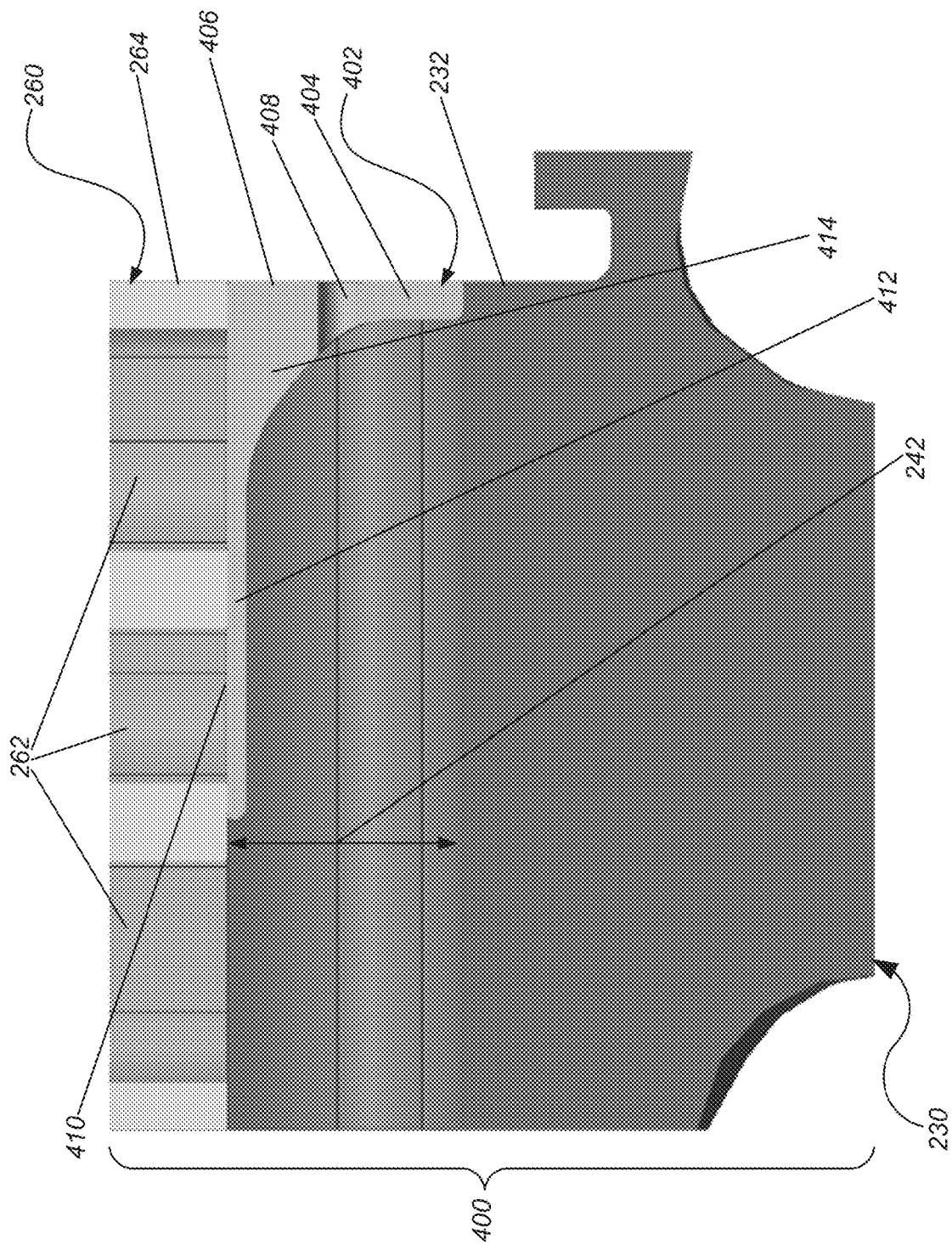
FIG. 7 illustrates a radial, forward-aft axial cross-sectional view of yet another example of a turbine blade-disc assembly through the circumferential center of the turbine blade-disc assembly including yet another example of a sealing plate.

FIG. 7 illustrates a radial, forward-aft axial cross-sectional view of yet another example of a turbine blade-disc assembly 400 through the circumferential center of the turbine blade-disc assembly 400 including yet another example of a sealing plate 402. The sealing plate 402 includes an axial tang 412, the axial tang 412 integral to the sealing plate 402, and an aft tang 404, the aft tang 404 integral to the sealing plate 402. Additionally, sealing plate 402 includes profile reinforcement 414, profile reinforcement 414 integral to the sealing plate 402, which may allow the turbine blade-disc assembly 400 to advantageously resist the forces associated with high speed turbine operation and intense loads. Sealing plate 402 may be machined from a forging or casting, rather than being stamped and bent from a single piece of sheet metal. The aft tang 404 extends in a radial direction across the radial distance 242 of the blade-to-disc gap 240 so as to advantageously seal most of the aft end of the vacant blade-to-disc gap 240, other than metering hole(s) 408, and avoid waste or loss in flow, when sealing plate 402 is brazed to blade inner radial surface 268 of cooled turbine blade 260 and cooled turbine blade 260 is attached to disc 230. The aft tang 204 includes a metering hole 408, such that purge cavity flow is advantageously controlled and directed aft of the turbine blade-disc assembly 400 through metering hole 408. Metering hole 408 is configured to receive purge cavity flow. In other examples of the sealing plate 402, the aft tang 404 may include more than one metering hole 408. The aft tang 404 includes an aft tang aft surface 406 that may be flush with the aft disc surface 232 of the aft portion 234 of the disc 230 when the sealing plate 402 is brazed to the blade inner radial surface 268 of the cooled turbine blade 260 and the cooled turbine blade 260 is attached to disc 230. Alternatively, or in addition, the aft tang aft surface 406 of the aft tang 404 may be flush with the blade aft surface 264 of the cooled turbine blade 260. The axial tang 412 includes an axial tang outer radial surface 410. The forward surface 416 (not shown in FIG. 7) of the aft tang 404 and an axial tang inner radial surface 418 of the axial tang 412 meet at an interior corner. Profile reinforcement 414 may be such that the interior corner has a fillet shape. The axial tang outer radial surface 410 of the axial tang 412 of the sealing plate 402 is brazed to the blade inner radial surface 268 of the cooled turbine blade 260, and the axial tang 412 is of such forward-aft dimension such that only the forward-most radial cooling passage 262 is open, and/or configured, to receive blade cooling flow. Sealing plate 402 may be advantageously machined from a casting or forging, thereby providing similar tolerances to a fir-tree style turbine blade attachment.

Figure 8:
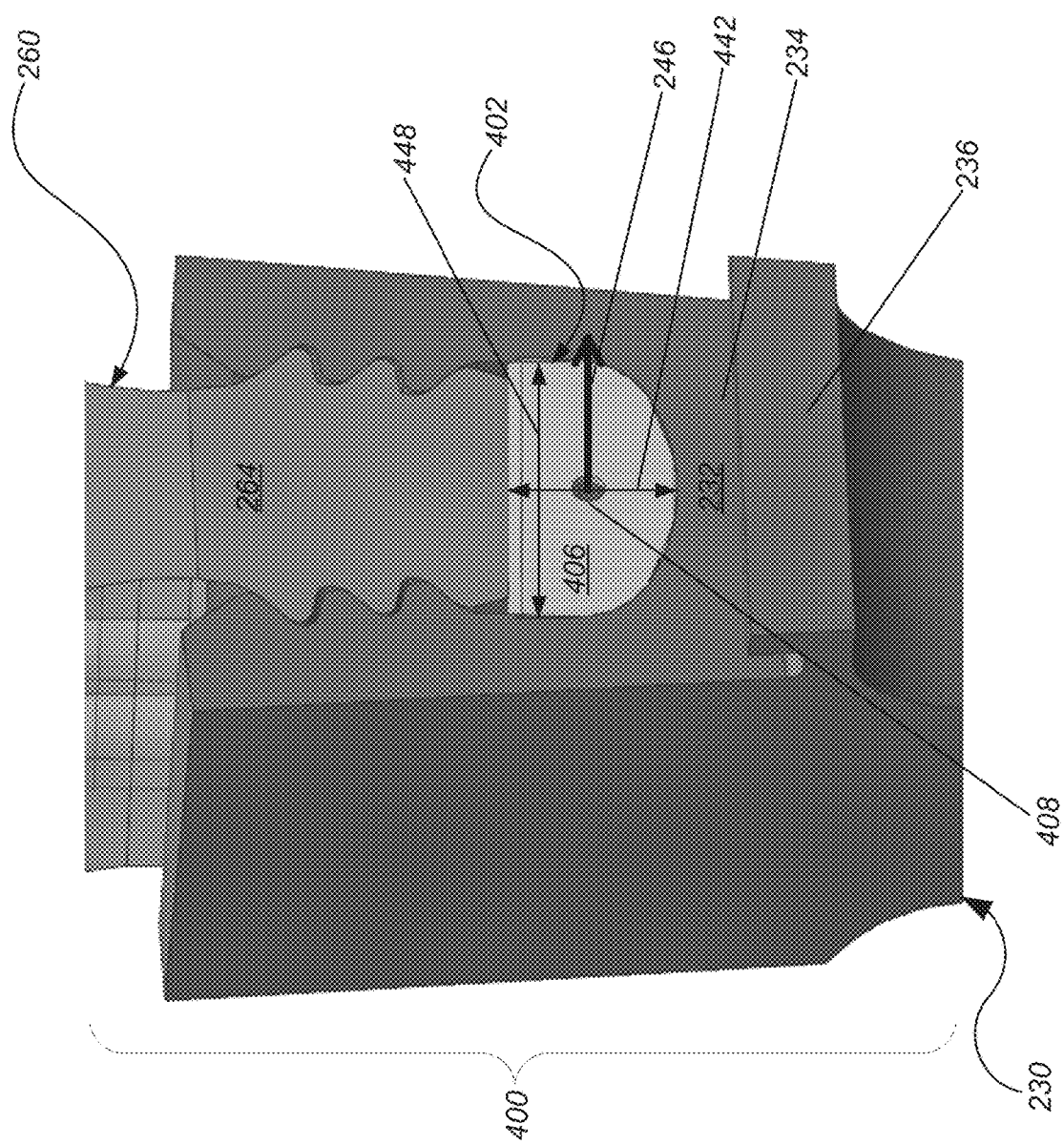
FIG. 8 illustrates an aft perspective view of the example of a turbine blade-disc assembly including the example of a sealing plate of FIG. 7.

FIG. 8 illustrates an aft perspective view of the example of a turbine blade-disc assembly 400 including the example of a sealing plate 402 of FIG. 7. The aft tang 404 extends in a circumferential direction across the circumferential distance 448 of the blade-to-disc gap 240 so as to advantageously seal most of the aft end of the vacant blade-to-disc gap 240 other than metering hole(s) 408 so as to advantageously control and direct purge cavity flow aft of the turbine blade-disc assembly 400, as illustrated by arrow 246. Metering hole(s) 408 are configured to receive purge cavity flow. The aft tang 404 also extends in a radial direction across the radial distance 442 of the blade-to-disc gap 240 so as to advantageously seal most of the aft end of the blade-to-disc gap 240 other than metering hole(s) 408.

Figure 9:
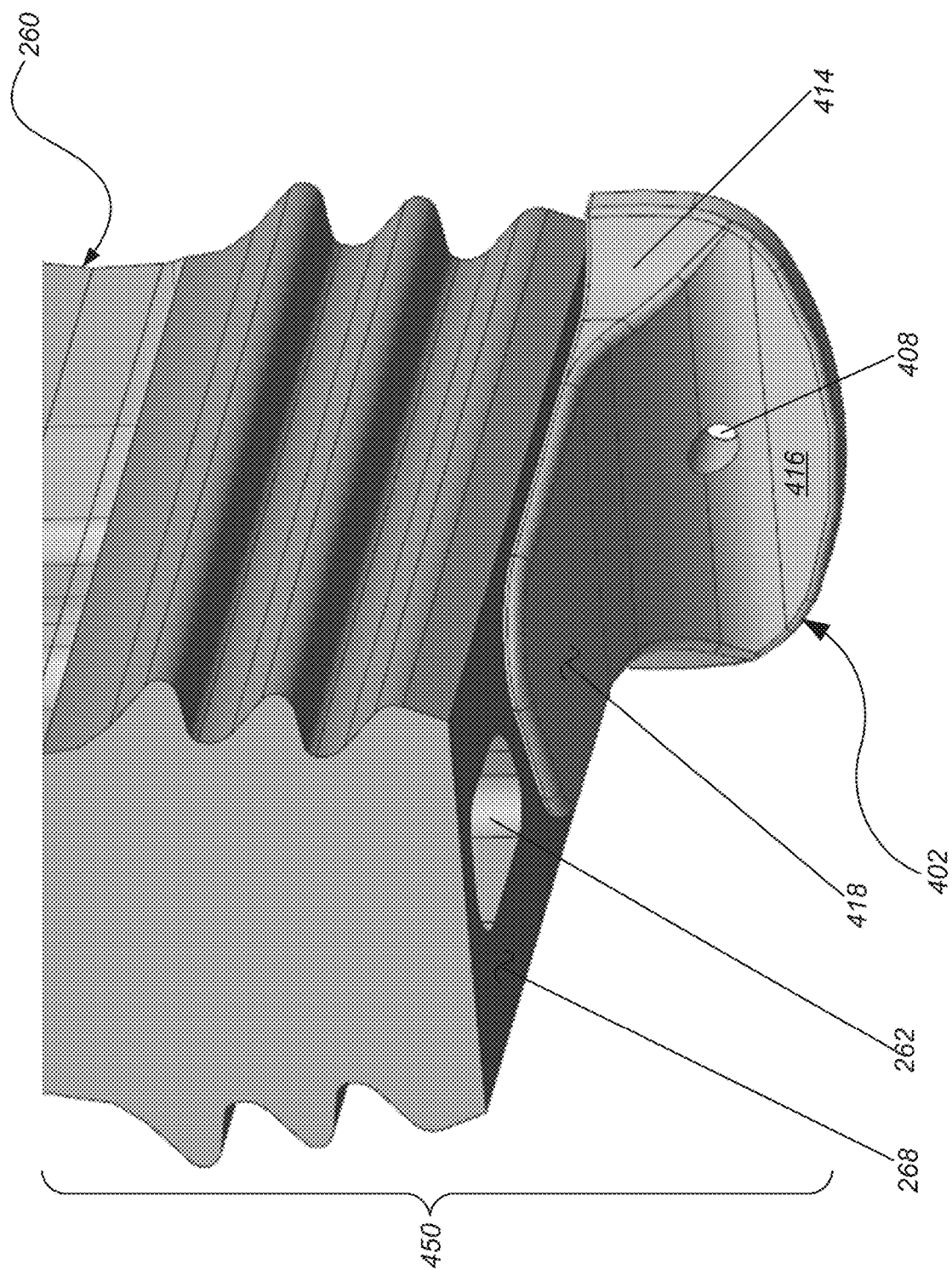
FIG. 9 illustrates a forward perspective view of an example of turbine blade-plate assembly including the example of a cooled turbine blade and a sealing plate of FIG. 7 with the example of a disc removed.

FIG. 9 illustrates a forward perspective view of the example of turbine blade-plate assembly 450 including the example of a cooled turbine blade 260 and a sealing plate 402 of FIG. 7 with the example of a disc 230 removed. The axial tang outer radial surface 410 of the axial tang 412 of the sealing plate 402 is brazed to the blade inner radial surface 268 of the cooled turbine blade 260 such that all but the forward-most radial cooling passage 262 is sealed by the sealing plate 402. Profile reinforcement 414 may be at an interior corner of sealing plate 402 such that axial tang inner radial surface 418 of axial tang 412 may meet forward surface 416 of aft tang 404 at an interior corner with a fillet shape.

Figure 10:
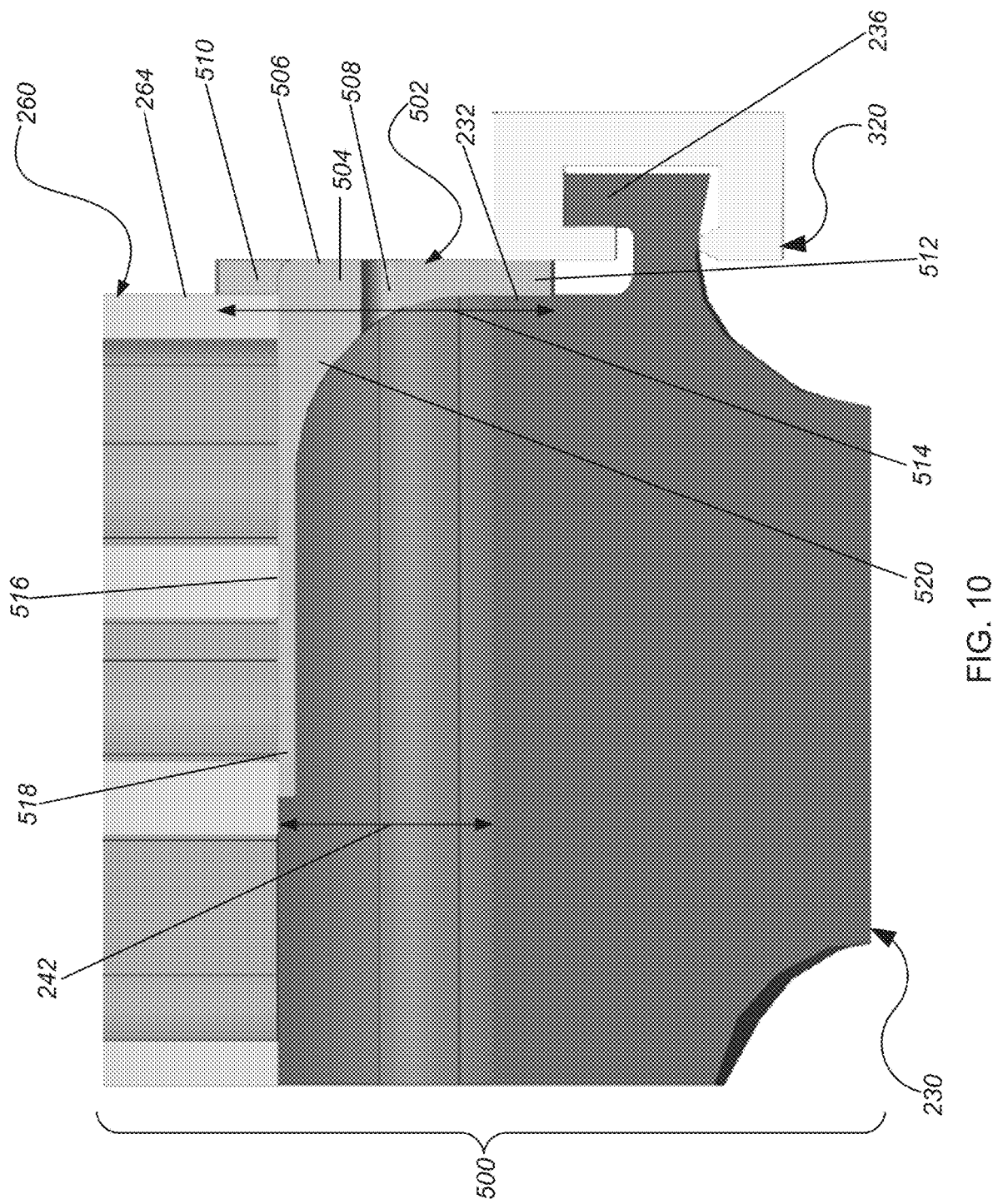
FIG. 10 illustrates a radial, forward-aft cross-sectional view of yet another example of a turbine blade-disc assembly through the circumferential center of the turbine blade-disc assembly including yet another example of a sealing plate and a retaining clip.

FIG. 10 illustrates a radial, forward-aft cross-sectional view of yet another example of a turbine blade-disc assembly 500 through the circumferential center of the turbine blade-disc assembly 500 including yet another example of a sealing plate 502 and a retaining clip 320. The sealing plate 502 includes an aft tang 504, the aft tang 504 integral to the sealing plate 502, the aft tang 504 including radial outward axial retention feature(s) 510 and radial inward axial retention feature 512, the radial outward axial retention feature(s) 510 and radial inward axial retention feature 512 integral to the sealing plate 502. The aft tang 504 includes an aft tang aft surface 506, which extends further in the aft direction than the blade aft surface 264 of cooled turbine blade 260 and further in the aft direction than the aft disc surface 232 of disc 230. Consequently, when sealing plate 502 is brazed to blade inner radial surface 268 of cooled turbine blade 260 and cooled turbine blade 260 is attached to disc 230, aft tang aft surface 506 may not be flush with either blade aft surface 264 of cooled turbine blade 260 or aft disc surface 232 of disc 230. The radial distance 514 from the outer radial edge of radial outward axial retention feature(s) 510 to the inner radial edge of radial inward axial retention feature 512 is greater than the radial distance 242 of the blade-to-disc gap 240. Accordingly, the aft tang 504 advantageously seals most of the aft end of the blade-to-disc gap 240, and additionally retains cooled turbine blade 260 axially when sealing plate 502 is brazed to blade inner radial surface 268 of cooled turbine blade 260 and cooled turbine blade 260 is attached to disc 230. The aft tang 504 includes a metering hole 508. Alternatively, the aft tang 504 may include more than one metering hole 508 (not shown). Sealing plate 502 includes axial tang 518, the axial tang 518 integral to the sealing plate 502, the axial tang 518 including axial tang outer radial surface 516. Axial tang outer radial surface 516 of axial tang 518 of sealing plate 502 is brazed to blade inner radial surface 268 of cooled turbine blade 260 such that all but the forward-most radial cooling passage 262 is sealed by the sealing plate 502. Sealing plate 502 further includes profile reinforcement 520, the profile reinforcement 520 integral to the sealing plate 502. Retaining clip 320 is reversibly engaged on aft hanger arm 236 to confront radial inward axial retention feature 512 and retain aft tang 504 against aft disc surface 232 of disc 230. Sealing plate 502 may be advantageously machined from a casting or forging, thereby providing similar tolerances to a fir-tree style turbine blade attachment.

Figure 11:
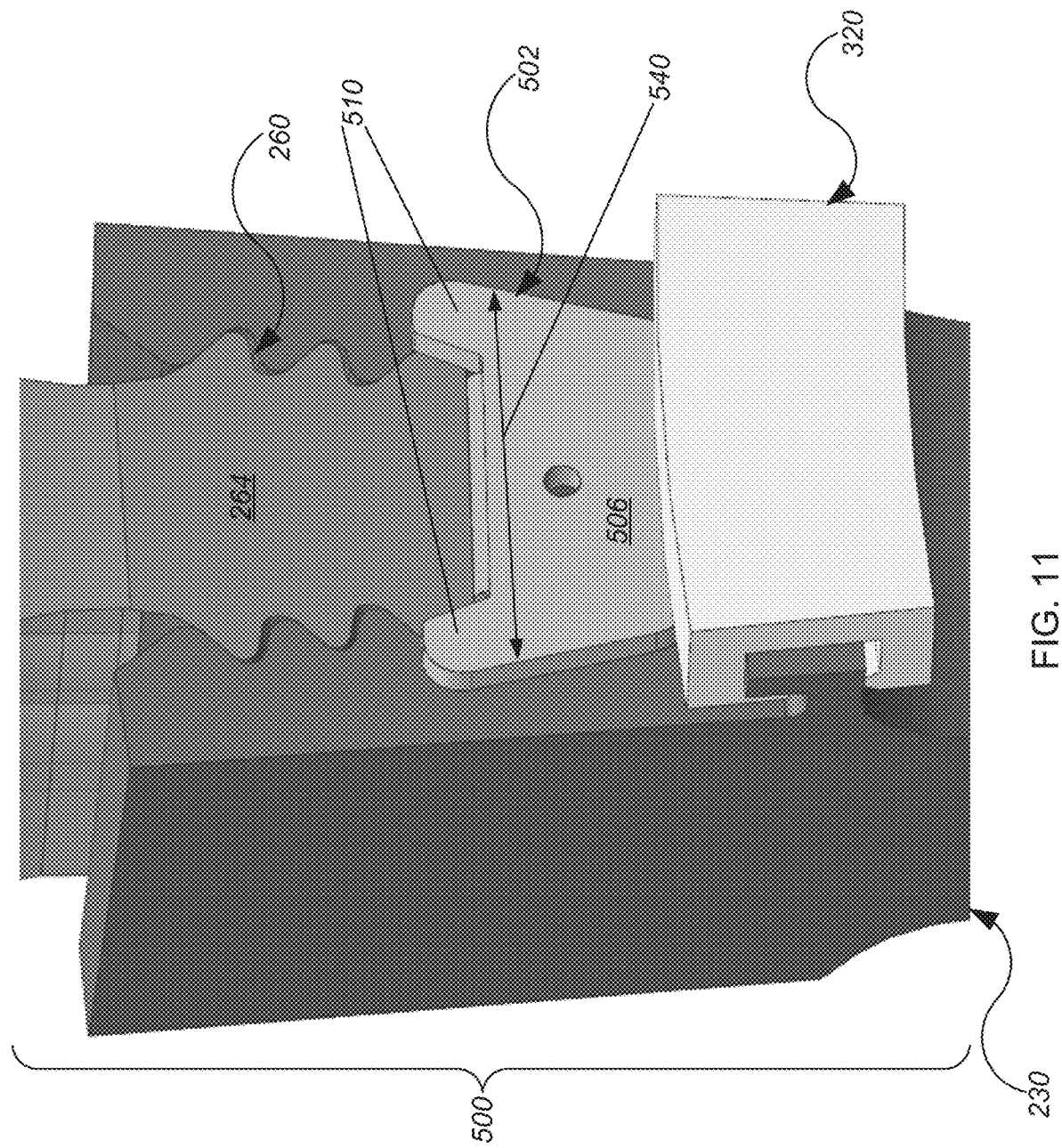
FIG. 11 illustrates an aft perspective view of the example of a turbine blade-disc assembly including the example of a sealing plate and a retaining clip of FIG. 10.

FIG. 11 illustrates an aft perspective view of the example of a turbine blade-disc assembly 500 including the example of a sealing plate 502 and a retaining clip 320 of FIG. 10. The aft tang aft surface 506 of aft tang 504 has a circumferential distance 540 that is greater than the circumferential distance 248 of the blade-to-disc gap 240. Accordingly, the aft tang 504 advantageously seals most of the aft end of the blade-to-disc gap 240 other than metering hole(s) 508 and additionally retains cooled turbine blade 260.

Figure 12:
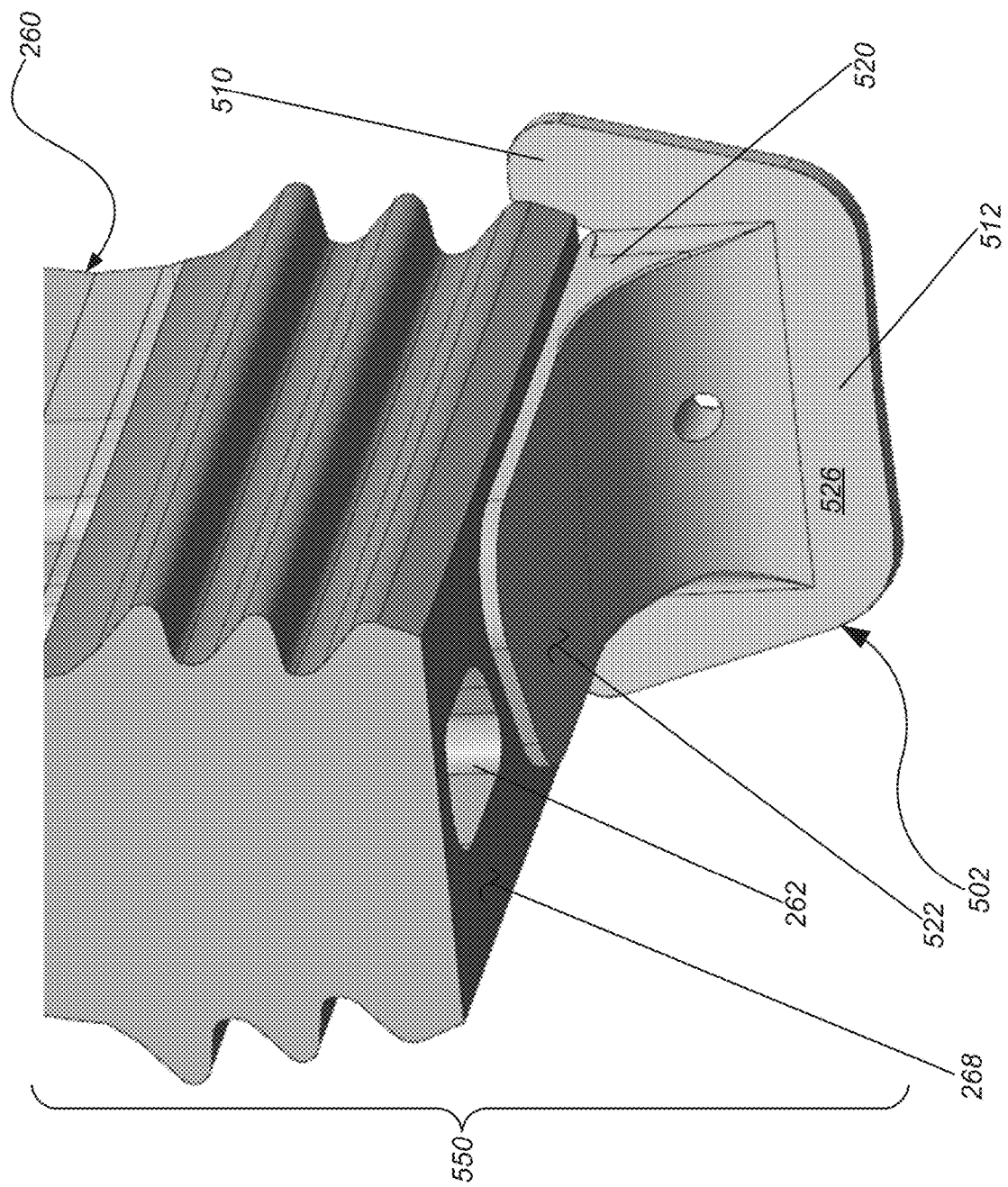
FIG. 12 illustrates a forward perspective view of the example of a turbine blade-disc assembly including the example of a sealing plate of FIG. 10 with the disc and the retaining clip removed.

FIG. 12 illustrates a forward perspective view of the example of turbine blade-plate assembly 550 including the example of a cooled turbine blade 260 and a sealing plate 502 of FIG. 10 with the example of a disc 230 removed. The axial tang outer radial surface 516 of the axial tang 518 is brazed to the blade inner radial surface 268 of the cooled turbine blade 260 such that all but the forward-most radial cooling passage 262 is sealed by the sealing plate 502. Profile reinforcement 520 may be at an interior corner of sealing plate 502 such that axial tang inner radial surface 522 of axial tang 518 may meet forward surface 526 of aft tang 504 at an interior corner with a fillet shape.

Figure 13:
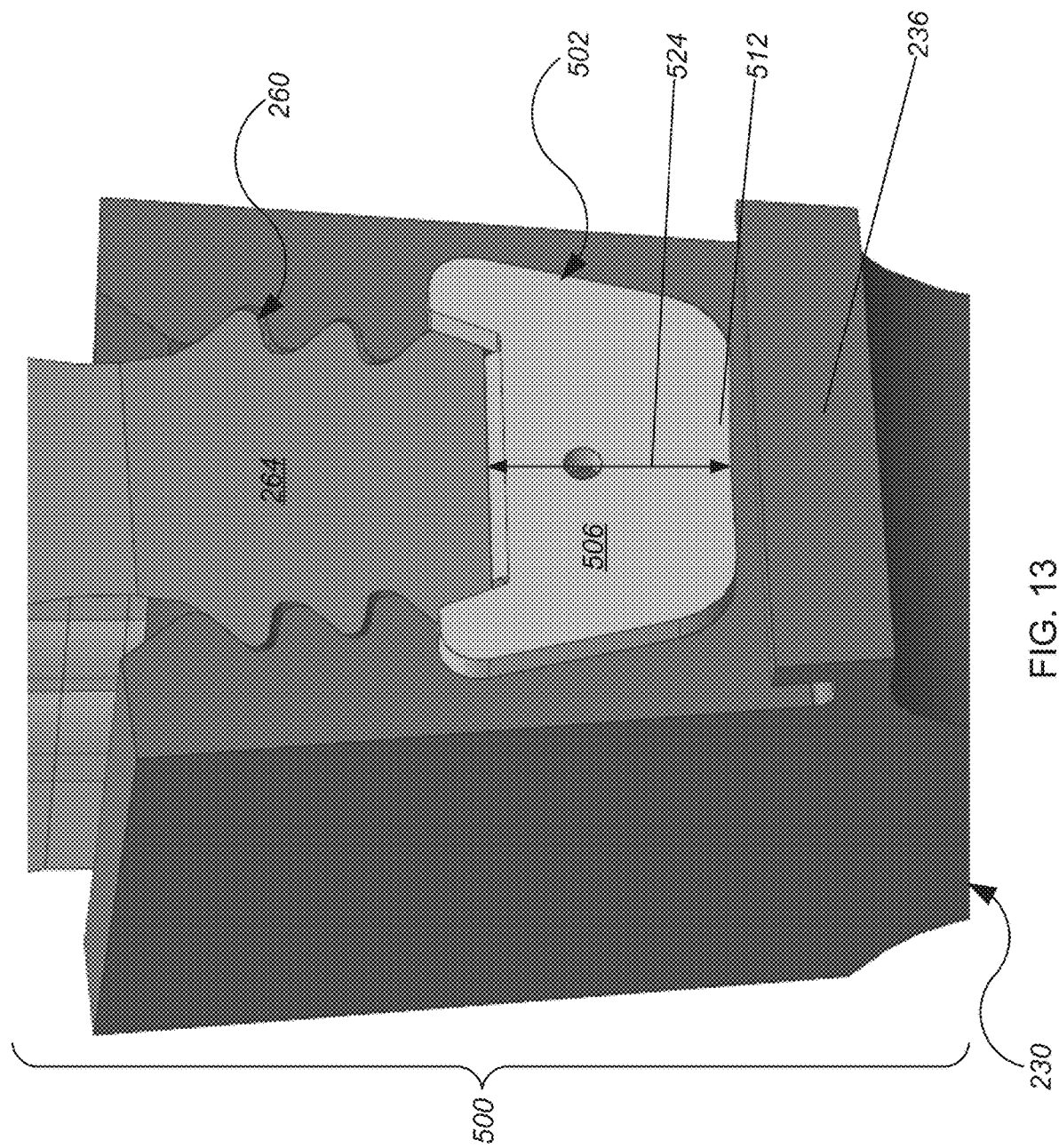
FIG. 13 illustrates an aft perspective view of the example of a turbine blade-disc assembly including the example of a sealing plate of FIG. 10 with the retaining clip removed.

FIG. 13 illustrates an aft perspective view of the example of a turbine blade-disc assembly 500 including the example of a sealing plate 502 of FIG. 10 with retaining clip 320 removed from aft hanger arm 236. The aft surface radial distance 524 from the outer radial edge at the circumferential center of aft tang aft surface 506 to the inner radial edge of the radial inward axial retention feature 512 is greater than the radial distance 242 of the blade-to-disc gap 240. Accordingly, the aft tang 504 advantageously seals most of the aft end of the blade-to-disc gap 240 other than metering hole(s) 508 and additionally retains cooled turbine blade 260 axially when sealing plate 502 is brazed to the blade inner radial surface 268 of cooled turbine blade 260 and cooled turbine blade 260 is attached to disc 230.

Figure 14:
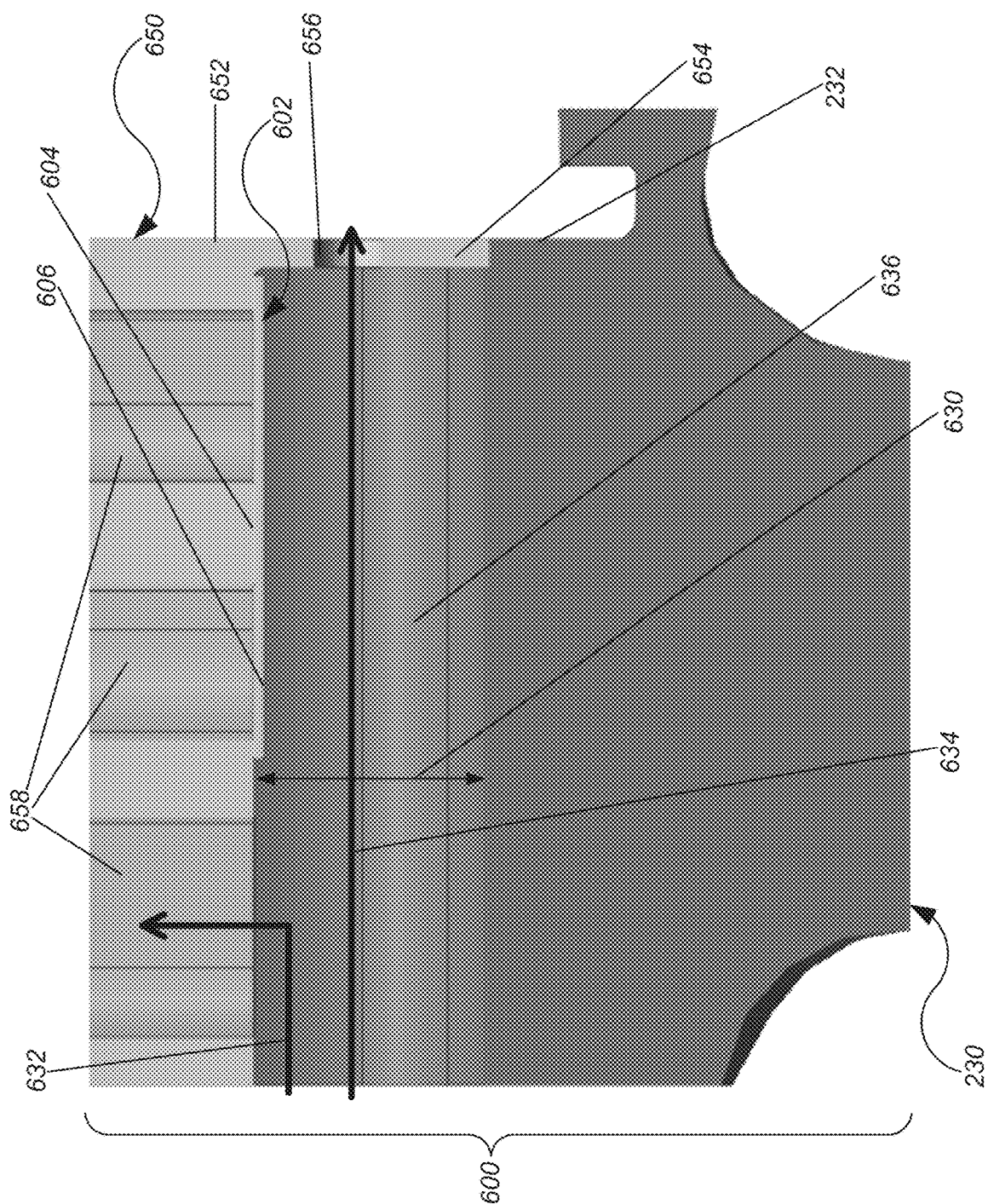
FIG. 14 illustrates a radial, forward-aft cross-sectional view of yet another example of a turbine blade-disc assembly through the circumferential center of the turbine blade-disc assembly including yet another example of a sealing plate.

FIG. 14 illustrates a radial, forward-aft cross-sectional view of yet another example of a turbine blade-disc assembly 600 through the circumferential center of the turbine blade-disc assembly 600 including yet another example of a sealing plate 602. Cooled turbine blade 650 includes aft tang 654, the aft tang 654 integral to the cooled turbine blade 650, the aft tang 654 extending radially inward relative to blade inner radial surface 660 to a radial distance 630 corresponding to the radial distance of the blade-to-disc gap 636 so as to seal the aft end of the blade-to-disc gap 636 when the cooled turbine blade 650 is attached to the disc 230 at aft tang 654. Aft tang 654 includes a metering hole 656. Alternatively, aft tang 654 may include more than one metering hole 656. Once the cooled turbine blade 650 is attached to the disc 230, the blade aft surface 652 of the cooled turbine blade 650 may be flush with the aft disc surface 232 of the disc 230. Sealing plate 602 includes an outer radial surface 604 and an inner radial surface 606. The outer radial surface 604 is brazed to the blade inner radial surface 660 and the sealing plate 602 is of such forward-aft dimension such that all radial cooling passages 658 except the forward-most radial cooling passage 658 are sealed off and only the forward-most radial cooling passage 658 is open, and/or configured, to receive blade cooling flow, the path of which is illustrated by arrow 632. Purge cavity flow is advantageously controlled and directed aft of the turbine blade-disc assembly 600 through metering hole(s) 656. Metering hole(s) 656 may be configured to receive purge cavity flow. The path of purge cavity flow is illustrated by arrow 634. Cooled turbine blade 650 and sealing plate 602 may be particularly advantageous by permitting tighter machining tolerances during manufacturing, and requiring only minor casting modifications. Sealing plate 602 may be advantageously stamped from an alloy.

Figure 15:
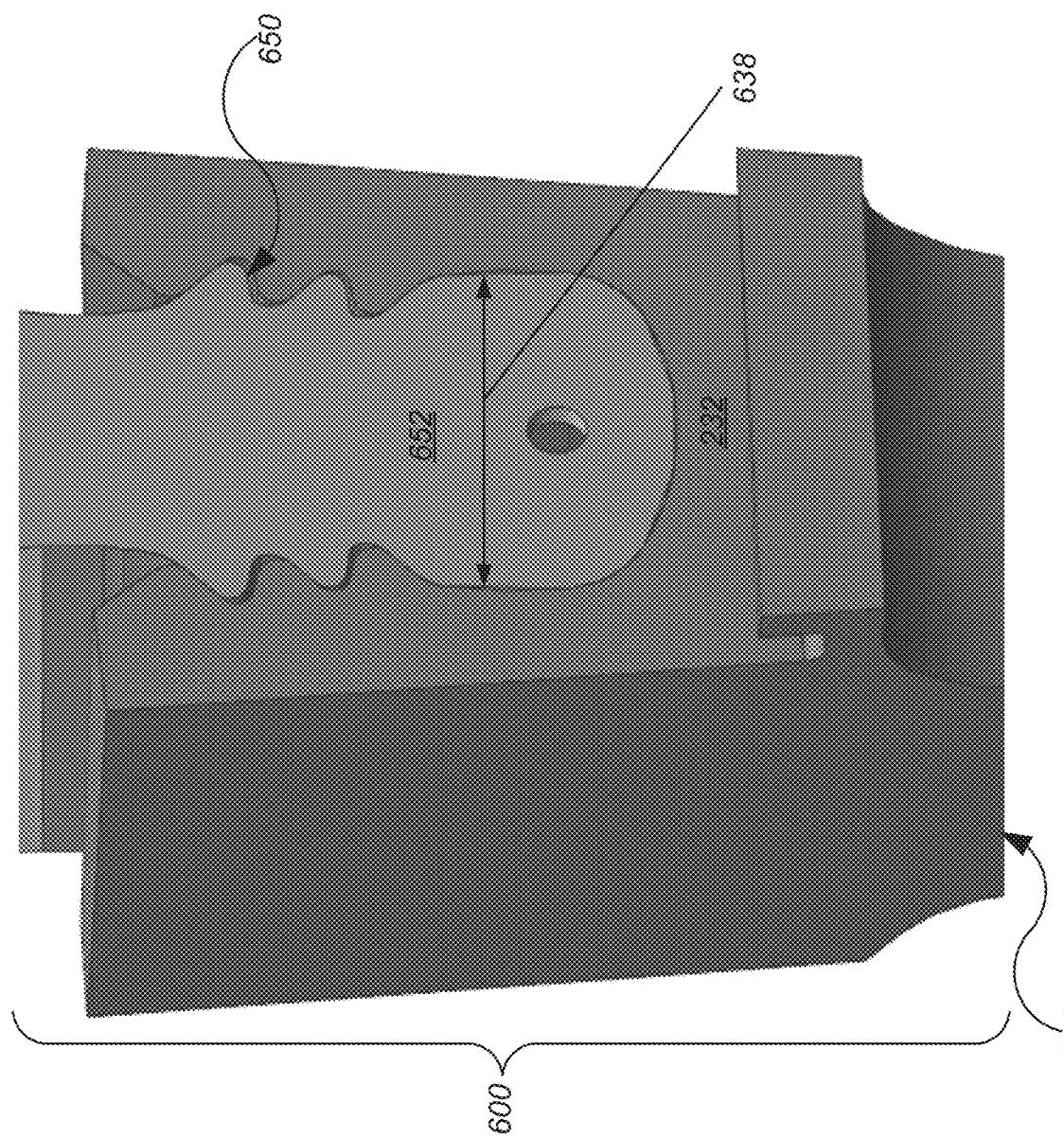
FIG. 15 illustrates an aft perspective view of the example of a turbine blade-disc assembly including the example of a sealing plate of FIG. 14.

FIG. 15 illustrates an aft perspective view of the example of turbine blade-disc assembly 600 including the example of a sealing plate 602 of FIG. 14. The aft tang 654 extends in a circumferential direction across the entire circumferential distance 638 of the blade-to-disc gap 636 so as to advantageously seal most of the aft end of the vacant blade-to-disc gap 636 other than metering hole(s) 656. The aft tang 654 also extends in a radial direction across the radial distance 630 of the blade-to-disc gap 636 so as to advantageously seal most of the aft end of the blade-to-disc gap 636 other than metering hole(s) 656 when the cooled turbine blade 650 is attached to disc 230.

Figure 16:
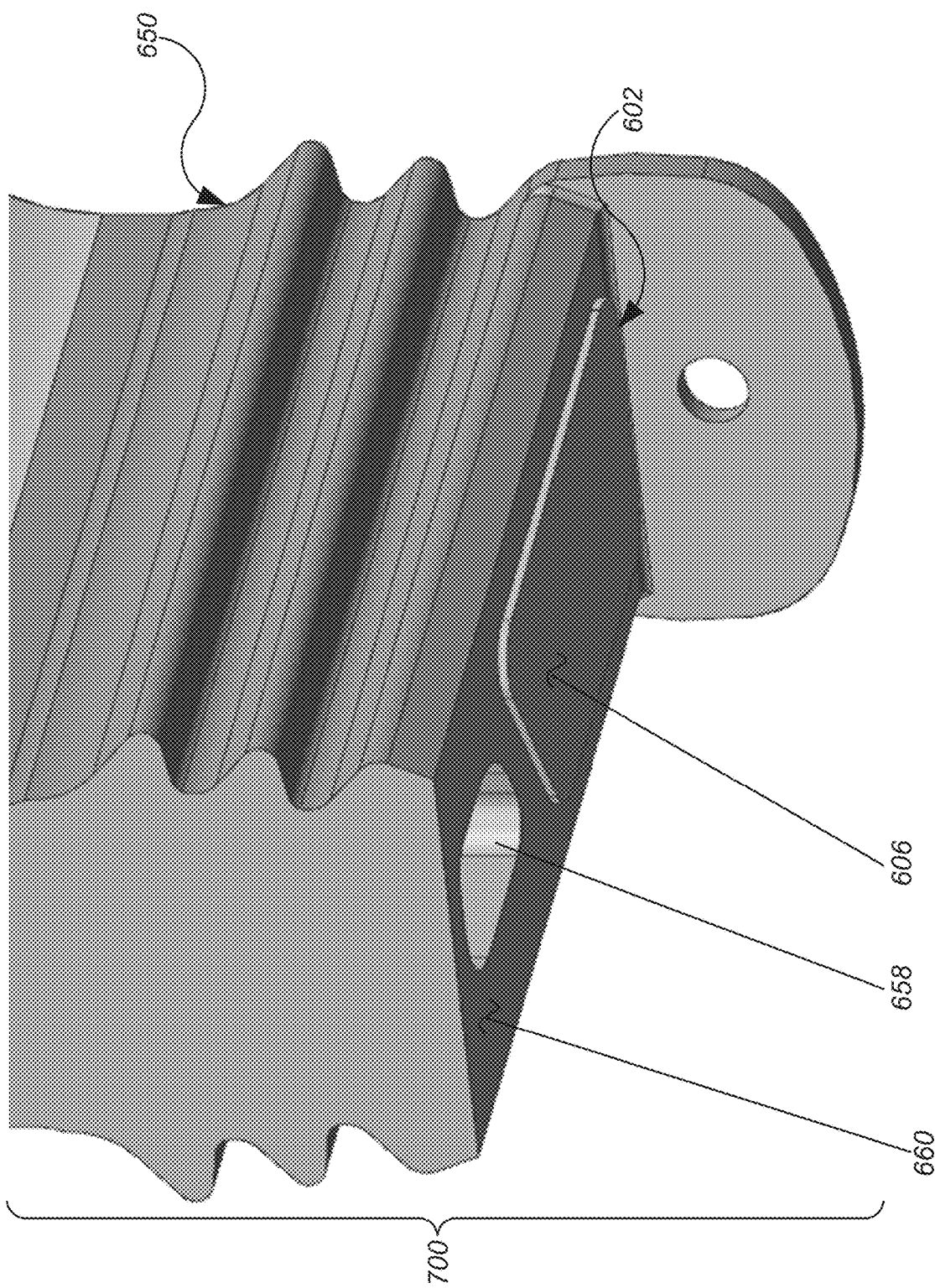
FIG. 16 illustrates a forward perspective view of the example of a turbine blade-disc assembly including the example of a sealing plate of FIG. 14 with the disc removed.

FIG. 16 illustrates a forward perspective view of the example of a turbine blade-plate assembly 700 including the example of a cooled turbine blade 650 and a sealing plate 602 of FIG. 14 with the example of a disc 230 removed. The outer radial surface 604 of the sealing plate 602 is brazed to the blade inner radial surface 660 of the cooled turbine blade 650 such that all but the forward-most radial cooling passage 658 is sealed by the sealing plate 602.

Without being bound by theory, the sealing plates of the present disclosure, by advantageously attaching to a cooled turbine blade, may be lighter than full-hoop coverplates, and may avoid the stress concentrations caused by segmented coverplates. Because sealing plates of the present disclosure are brazed directly to cooled turbine blades, it is expected that problematic issues associated with "walking" segmented coverplates will not apply. The sealing plates of the present disclosure advantageously supply a steady blade cooling flow and purge cavity flow such that the highest stress area of a turbine disc may be operated at a cooling temperature, potentially prolonging turbine disc life. The sealing plates of the present disclosure may reduce stress on the cooled turbine blade relative to segmented coverplates. Each sealing plate may include additional or fewer components. In the context of the present disclosure, a first piece is said to be "integral" to a second piece if the first and second pieces are formed as a single piece. For example, if the first and second pieces are cast as a single metal or metal alloy piece, then the first piece is integral to the second piece.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more." Unless otherwise indicated or the context suggests otherwise, as used herein, "plurality of" is defined by the Applicant in the broadest sense, superseding any other implied definitions or limitations hereinbefore or hereinafter unless expressly asserted by the Applicant to the contrary, to mean a quantity of more than one.

All methods described herein can be performed in any suitable order unless otherwise indicated herein or otherwise clearly contradicted by context.

While various examples have been described, it will be apparent to those of ordinary skill in the art that many more examples and implementations are possible. Accordingly, the examples described herein are not the only possible implementations.

The subject-matter of the disclosure may also relate, among others, to the following aspects:

A first aspect relates to a sealing plate comprising: an aft tang comprising an aft tang aft surface, a forward surface, and a metering hole through the aft tang from the forward surface to the aft tang aft surface; an axial tang comprising an axial tang outer radial surface and an axial tang inner radial surface, the axial tang integral to the aft tang; and an interior corner between the forward surface and the axial tang inner radial surface; wherein the axial tang outer radial surface is brazed to a blade inner radial surface of a cooled turbine blade, the cooled turbine blade comprising a plurality of radial cooling passages extending radially outward from the blade inner radial surface; wherein the sealing plate seals each of the plurality of radial cooling passages except for a forward-most radial cooling passage of the plurality of radial cooling passages; and wherein when the cooled turbine blade is attached to a turbine disc, an aft end of a blade-to-disc gap is sealed by the aft tang.

A second aspect relates to the sealing plate of aspect 1, further comprising a profile reinforcement at the interior corner.

A third aspect relates to the sealing plate of any preceding aspect, wherein the forward-most radial cooling passage is configured to receive a blade cooling flow.

A fourth aspect relates to the sealing plate of any preceding aspect, wherein the metering hole is configured to receive a purge cavity flow.

A fifth aspect relates to the sealing plate of any preceding aspect, wherein the sealing plate is configured to reduce mechanical stress on the cooled turbine blade during turbine operation compared to a segmented coverplate.

A sixth aspect relates to the sealing plate of any preceding aspect, wherein the aft tang comprises more than one metering hole.

A seventh aspect relates to the sealing plate of aspect 1, wherein the aft tang further comprises radial outward axial retention features, the radial outward axial retention features extending radially outward along a blade aft surface of the cooled turbine blade, and wherein the radial outward axial retention features retain the cooled turbine blade axially.

An eighth aspect relates to the sealing plate of aspect 7, wherein the aft tang further comprises a radial inward axial retention feature, the radial inward axial retention feature extending radially inward along an aft disc surface of the turbine disc.

A ninth aspect relates to the sealing plate of aspect 8, wherein a retainer clip disposed on an aft hanger arm of the turbine disc reversibly confronts the radial inward axial retention feature and retains the aft tang against the aft disc surface.

A tenth aspect relates to a sealing plate comprising: an outer surface; and an inner surface; wherein the outer surface is brazed to an inner radial surface of a cooled turbine blade, the cooled turbine blade comprising: an aft surface; a forward surface; a plurality of radial cooling passages extending radially outward from the inner radial surface; and an aft tang extending radially inward along the aft surface, the aft tang comprising a metering hole; and wherein the sealing plate seals each of the plurality of radial cooling passages at the inner radial surface except for a forward-most radial cooling passage of the plurality of radial cooling passages.

An eleventh aspect relates to the sealing plate of aspect 10, wherein when the cooled turbine blade is attached to a turbine disc, an aft end of a blade-to-disc gap is sealed by the aft tang of the cooled turbine blade.

A twelfth aspect relates to the sealing plate of aspect 10, wherein the forward-most radial cooling passage is configured to receive a blade cooling flow.

A thirteenth aspect relates to the sealing plate of aspect 10, wherein the metering hole is configured to receive a purge cavity flow.

In addition to the features mentioned in each of the independent aspects enumerated above, some examples may show, alone or in combination, the optional features mentioned in the dependent aspects and/or as disclosed in the description above and shown in the figures.

What is claimed is:

1. A sealing plate, comprising:
   an aft tang comprising an aft tang aft surface, a forward surface, and a metering hole through the aft tang from the forward surface to the aft tang aft surface;
   an axial tang comprising an axial tang outer radial surface and an axial tang inner radial surface, the axial tang integral to the aft tang; and
   an interior corner between the forward surface and the axial tang inner radial surface;
   wherein the axial tang outer radial surface is brazed to a blade inner radial surface of a cooled turbine blade, the cooled turbine blade comprising a plurality of radial cooling passages extending radially outward from the blade inner radial surface;
   wherein the sealing plate seals each of the plurality of radial cooling passages except for a forward-most radial cooling passage of the plurality of radial cooling passages; and wherein when the cooled turbine blade is attached to a turbine disc, an aft end of a blade-to-disc gap is sealed by the aft tang.

2. The sealing plate of claim 1, further comprising a profile reinforcement at the interior corner.

3. The sealing plate of claim 1, wherein the aft tang further comprises radial outward axial retention features, the radial outward axial retention features extending radially outward along a blade aft surface of the cooled turbine blade, and wherein the radial outward axial retention features retain the cooled turbine blade axially.

4. The sealing plate of claim 3, wherein the aft tang further comprises a radial inward axial retention feature, the radial inward axial retention feature extending radially inward along an aft disc surface of the turbine disc.

5. The sealing plate of claim 4, wherein a retainer clip disposed on an aft hanger arm of the turbine disc reversibly confronts the radial inward axial retention feature and retains the aft tang against the aft disc surface.

6. The sealing plate of claim 1, wherein the forward-most radial cooling passage is configured to receive a blade cooling flow.

7. The sealing plate of claim 1, wherein the metering hole is configured to receive a purge cavity flow.

8. The sealing plate of claim 1, wherein the sealing plate is configured to reduce mechanical stress on the cooled turbine blade during turbine operation compared to a segmented coverplate.

9. The sealing plate of claim 1, wherein the aft tang comprises more than one metering hole.

10. A sealing plate, comprising:
an aft tang, comprising an aft tang aft surface, a forward surface, a metering hole through the aft tang from the forward surface to the aft tang aft surface, radial outward axial retention features, and a radial inward axial retention feature;
an axial tang, comprising an axial tang outer radial surface and an axial tang inner radial surface, the axial tang integral to the aft tang; and
an interior corner between the forward surface and the axial tang inner radial surface;
wherein the axial tang outer radial surface is brazed to a blade inner radial surface of a cooled turbine blade, the cooled turbine blade comprising a plurality of radial cooling passages extending radially outward from the blade inner radial surface;
wherein the sealing plate seals each of the plurality of radial cooling passages at the blade inner radial surface except for a forward-most radial cooling passage of the plurality of radial cooling passages;
wherein the radial outward axial retention features extend radially outward along a blade aft surface of the cooled turbine blade, the radial outward axial retention features retaining the cooled turbine blade axially;
wherein the radial inward axial retention feature extends radially inward along an aft disc surface of a turbine disc; and
wherein when the cooled turbine blade is attached to the turbine disc, an aft end of a blade-to-disc gap is sealed by the aft tang.

11. The sealing plate of claim 10, wherein a retainer clip disposed on an aft hanger arm of the turbine disc reversibly confronts the radial inward axial retention feature and retains the aft tang against the aft disc surface.

12. The sealing plate of claim 10, further comprising a profile reinforcement at the interior corner.

13. The sealing plate of claim 10, wherein the forward-most radial cooling passage is configured to receive a blade cooling flow.

14. The sealing plate of claim 10, wherein the metering hole is configured to receive a purge cavity flow.

15. The sealing plate of claim 10, wherein the sealing plate is configured to reduce mechanical stress on the cooled turbine blade during turbine operation compared to a segmented coverplate.

16. The sealing plate of claim 10, wherein the aft tang comprises more than one metering hole.

17. A sealing plate, comprising:
a outer surface; and
an inner surface;
wherein the outer surface is brazed to a blade inner radial surface of a cooled turbine blade, the cooled turbine blade comprising:
an aft surface;
a forward surface;
a plurality of radial cooling passages extending radially outward from the inner radial surface; and
an aft tang extending radially inward along the aft surface, the aft tang comprising a metering hole; and
wherein the sealing plate seals each of the plurality of radial cooling passages at the blade inner radial surface except for a forward-most radial cooling passage of the plurality of radial cooling passages.

18. The sealing plate of claim 17, wherein when the cooled turbine blade is attached to a turbine disc, an aft end of a blade-to-disc gap is sealed by the aft tang of the cooled turbine blade.

19. The sealing plate of claim 17, wherein the forward-most radial cooling passage is configured to receive a blade cooling flow.

20. The sealing plate of claim 17, wherein the metering hole is configured to receive a purge cavity flow.

* * * * *